Figure 1:
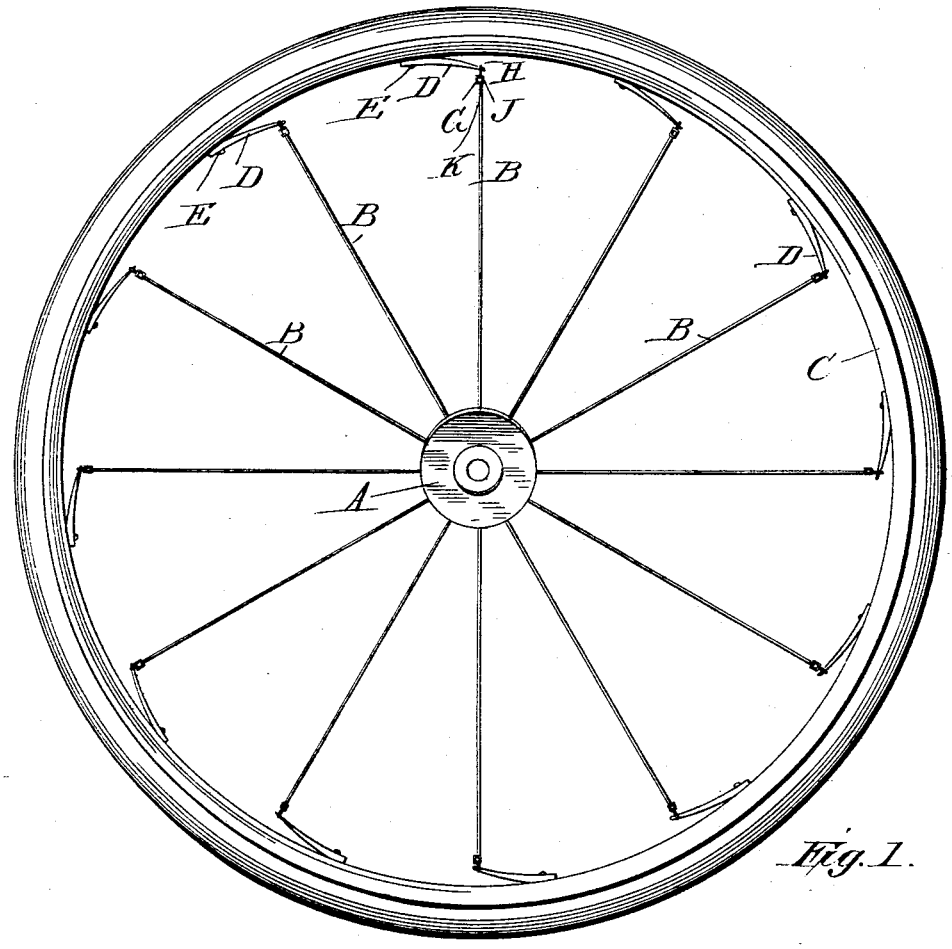

(No Model.)

W. H. KADEL.
BICYCLE WHEEL.

No. 591,922. Patented Oct. 19, 1897.

Witnesses
Franck L. Ourand
George J. Weber

Inventor
William H. Kadel
By John G. Manahan
Attorney

UNITED STATES PATENT OFFICE.

WILLIAM H. KADEL, OF ROCK FALLS, ILLINOIS, ASSIGNOR OF ONE-THIRD TO HARRY L. KADEL, OF SAME PLACE.

BICYCLE-WHEEL.

SPECIFICATION forming part of Letters Patent No. 591,922, dated October 19, 1897.

Application filed December 11, 1896. Serial No. 615,262. (No model.)

*To all whom it may concern:*

Be it known that I, WILLIAM H. KADEL, a citizen of the United States, residing at Rock Falls, in the county of Whiteside and State of Illinois, have invented certain new and useful Improvements in Bicycle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in bicycle-wheels, and pertains more particularly to the suspension of the weight of the rider upon springs suitably attached to the inner surface of the wheel-rim. As is well known to those familiar with this art a pneumatic tire has been considered indispensable in order to relieve the rider from the vertical jolts occasioned by irregularities in the path of the wheel. The objection to this method of avoiding such jolts is that it involved, necessarily, a hollow rubber or elastic tube containing air in a compressed condition. The said condition is objectionable from two points: First, the distention of the pneumatic tire was the same regardless of the weight of the occupant of the wheel, and, second, the hollow rubber tire was liable to puncture from any sharp or protruding obstacle in the path of its progress. These punctures necessarily caused a collapse of the tire, and as they occurred without any preliminary notice were as likely as not to happen when the rider was a distance from his home, thus either compelling a delay for repairs or, as was frequently the case, the dismounting of the rider and a return on foot. This was a constant and an inevitable menace to every wheel in which an inflated pneumatic tire was relied upon to relieve the body of the occupant from vertical jolts caused by irregularities in the path of the wheel. The elasticity afforded by the pneumatic tire was and is satisfactory, except from the attendant exposure to puncture, liable to occur at any moment and to disable the wheel.

The object of my invention is provide and assure the essential elasticity of the seat of the rider, so as to relieve the latter from the otherwise vertical jolts occasioned by the irregularities in the path of the wheel, and at the same time to permit of the use of a felly and tire which, being not filled with air under compression, is not liable to be injured or destroyed by punctures from the outside. To accomplish this purpose, I suspend the weight of the rider upon a series of springs suitably attached to the inner surface of the rim of the wheel, and thereby render it feasible to use a solidified, as distinguished from a hollow, perimeter for the carrying-wheels.

A further purpose of my invention is to regulate the tension of the aforesaid springs adjustably to the weight of the rider, so that a rider of less avoirdupois may have such spring regulated to be flexible under such lesser weight.

These objects I attain by the mechanism illustrated in the accompanying drawings, in which—

Figure 2:
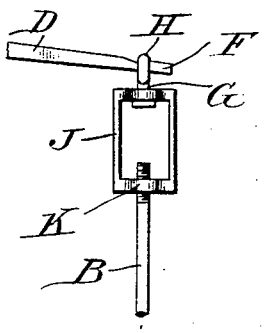

Figure 1 is a perspective of a wheel embodying my invention. Fig. 2 is a detail of the adjusting device aforesaid.

Similar letters of reference refer to the same parts in each view.

As my invention has reference to the construction of the wheel itself and is equally applicable to and advantageous in each of the well-known types of bicycles, I do not deem it necessary to show or describe the entire vehicle or any more thereof than will render intelligible the construction, location, and operation of my invention.

A is the usual hub of a bicycle-wheel, to which the wire spokes B are attached at their inner ends in any of the usual modes.

C is the rim of the wheel, which may be constructed of any material combining the requisites of lightness and strength. In the wheel which I have constructed the inner portion of the rim C is of wood, having the inner convex and the outer concave surfaces, and in the outer concaved or grooved surface is placed a suitable cork tire, which latter affords all the essentials of a suitable tire as well as being extremely light. However, as the elastic support essential for the comfort of the rider, as aforesaid, is afforded by the construction between the hub and the rim of the wheel my invention can be advantageously used with any solid and permanent rim and tire. Around the inner surface of the rim C and at suitable intervals to meet the respectively radiating spokes B are provided the steel springs D, one end of which is suitably riveted or bolted at E to the inner face of the rim C, and the other or free end F of the spring D is normally projected along the inner surface of the rim C and nearly or quite parallel therewith. The spokes B are attached at their inner ends to the hub A in any suitable manner and at their opposite or outer ends to the free ends of the springs D, respectively. By this construction the upper of the spokes B sustain and suspend the hub A by depending from the free ends F of the springs D. The normal resiliency of the springs D is toward the rim C, but the downward pull of the upper series of spokes B tend to draw the ends F of the springs D downwardly from the rim C. The action, therefore, instead of being one to force out or expand the rim C, tends to draw the rim C inwardly on converging lines and thereby strengthen the wheel against outward fracture. The spokes B are so connected to the springs D as to afford means for adjusting the tension of the latter to accommodate their resiliency to riders of different weights.

Referring to Fig. 2, a turnbuckle G, having an outer looped end H seated on the spring D, is projected downwardly and pivoted in the upper end of the swivel-nut J. In the lower end of said nut is formed a threaded vertical opening K, into which the outer end of the spoke B, having conformable threads, is seated, and by turning the swivel-nut J in either direction the tension of the spring D may be varied in proportion to the weight of the rider. The aforesaid tension of the spring D may be varied by an adjusting-nut on the inner end of the spoke B, such inner end of said spoke being either projected through a cylinder or a flange formed laterally on some suitable portion of the hub A; but I prefer the adjustment at the outer end of the spoke, mainly for the reason that there is more space for a swivel of suitable size and the locality is more accessible for the purpose of making such adjustment.

The springs F may be of any suitable conformation and attached in any suitable mode to furnish the aforesaid elastic support to the hub A.

What I claim as my invention, and desire to secure by Letters Patent of the United States, is—

In a wheel, the combination, with a rim, of a series of springs rigidly secured to the inner surface thereof at one end, a hub and a series of spokes secured thereto, the outer end of each spoke being screw-threaded, a swivel-nut upon the end of each spoke, and a turnbuckle secured to the nut and provided with a loop through which is passed the free end of the spring, substantially as set forth.

In testimony whereof I affix my signature in presence of two witnesses.

WILLIAM H. KADEL.

Witnesses:
 JOHN G. MANAHAN,
 ISABELLE MANAHAN.